`US010427224B2`

United States Patent
Straka et al.

(10) Patent No.: US 10,427,224 B2
(45) Date of Patent: Oct. 1, 2019

(54) DRILL AND DRILL INSERT WITH CHIPBREAKER PROTRUSIONS

(71) Applicant: PRAMET TOOLS, S.R.O., Sumperk (CZ)

(72) Inventors: Martin Straka, Sumperka (CZ); Roman Reindl, Sumperk (CZ); Marios Goltsis, Norrkoping (SE); Simon Hellborg, Norrkoping (SE)

(73) Assignee: PRAMET TOOLS, S.R.O., Sumperk (CZ)

( * ) Notice: Subject to any disclaimer, the term of this patent is extended or adjusted under 35 U.S.C. 154(b) by 15 days.

(21) Appl. No.: 15/537,405

(22) PCT Filed: Dec. 9, 2015

(86) PCT No.: PCT/EP2015/079116
§ 371 (c)(1),
(2) Date: Jun. 19, 2017

(87) PCT Pub. No.: WO2016/096567
PCT Pub. Date: Jun. 23, 2016

(65) Prior Publication Data
US 2017/0368613 A1      Dec. 28, 2017

(30) Foreign Application Priority Data
Dec. 19, 2014   (EP) ..................................... 14199358

(51) Int. Cl.
*B23B 51/04*   (2006.01)
*B23B 27/14*   (2006.01)

(52) U.S. Cl.
CPC .......... *B23B 51/048* (2013.01); *B23B 27/143* (2013.01); *B23B 2200/321* (2013.01); *B23B 2251/48* (2013.01); *B23B 2251/50* (2013.01); *Y10T 407/235* (2015.01)

(58) Field of Classification Search
CPC ................ B23B 27/143; B23B 51/048; B23B 2200/321; B23B 2251/48
See application file for complete search history.

(56) References Cited

U.S. PATENT DOCUMENTS

| | | | | |
|---|---|---|---|---|
| 4,194,862 A | * | 3/1980 | Zweekly | ............. B23B 51/0493 408/224 |
| 4,214,845 A | | 7/1980 | Mori | |
| 4,215,957 A | * | 8/1980 | Holma | ................ B23B 27/1618 407/114 |

(Continued)

FOREIGN PATENT DOCUMENTS

| | | |
|---|---|---|
| CN | 103862074 A | 6/2014 |
| DE | 266293 A1 | 3/1989 |

(Continued)

*Primary Examiner* — Eric A Gates
(74) *Attorney, Agent, or Firm* — Corinne R. Gorshki (57) ABSTRACT

A drill includes drill body and peripheral insert having a radial cutting edge extending generally in a direction of a radius of the drill body, and a central insert. The peripheral insert includes a rake face including a plurality of chipbreaker protrusions. A first angle measured between a line tangent to forward ends of the plurality of chipbreaker protrusions and the central axis of the drill body extending toward the shank end is an acute angle. Also a peripheral insert is disclosed.

12 Claims, 5 Drawing Sheets

(56) References Cited

U.S. PATENT DOCUMENTS

| | | | | |
|---|---|---|---|---|
| 4,741,649 | A * | 5/1988 | Mori | B23B 27/143 407/114 |
| 5,282,703 | A * | 2/1994 | Itaba | B23B 27/143 407/114 |
| 5,688,083 | A * | 11/1997 | Boianjiu | B23B 27/141 407/113 |
| 5,695,303 | A * | 12/1997 | Boianjiu | B23B 27/141 407/114 |
| 5,709,509 | A * | 1/1998 | Wegener | B23C 5/2213 407/114 |
| 5,791,833 | A * | 8/1998 | Niebauer | B23B 27/141 407/114 |
| 5,810,520 | A * | 9/1998 | Hintze | B23B 27/143 407/114 |
| 5,921,722 | A * | 7/1999 | Paya | B23B 27/143 407/113 |
| 5,967,710 | A * | 10/1999 | Krenzer | B23B 27/141 407/114 |
| 6,123,488 | A * | 9/2000 | Kasperik | B23B 27/141 407/113 |
| 6,186,705 | B1 | 2/2001 | Kumar et al. | |
| 6,599,061 | B1 * | 7/2003 | Nelson | B23B 27/143 407/114 |
| 6,957,935 | B2 * | 10/2005 | Sung | B23C 5/202 407/113 |
| 7,182,555 | B2 * | 2/2007 | Kitagawa | B23B 27/141 407/113 |
| 7,677,845 | B2 | 3/2010 | Limell et al. | |
| 8,025,465 | B2 * | 9/2011 | Ishida | B23C 5/06 407/113 |
| 8,262,324 | B2 * | 9/2012 | Park | B23B 27/141 407/113 |
| 8,267,623 | B2 * | 9/2012 | Park | B23B 27/143 407/113 |
| 8,337,123 | B2 * | 12/2012 | Ishida | B23C 5/06 407/113 |
| 8,393,831 | B2 * | 3/2013 | Onozawa | B23B 51/048 408/223 |
| 8,434,975 | B2 * | 5/2013 | Choi | B23C 5/202 407/100 |
| 8,475,092 | B2 * | 7/2013 | Ishida | B23C 5/06 407/114 |
| 8,757,940 | B2 * | 6/2014 | Ishida | B23C 5/06 407/113 |
| 9,278,395 | B2 * | 3/2016 | Matsuo | B23C 5/109 |
| 9,586,264 | B2 * | 3/2017 | Dufour | B23B 27/141 |
| 2008/0226943 | A1 * | 9/2008 | Fang | C22C 1/051 428/697 |
| 2008/0260476 | A1 * | 10/2008 | Ishida | B23C 5/06 407/114 |
| 2009/0238649 | A1 * | 9/2009 | Kruszynski | B23B 27/141 407/40 |
| 2010/0061813 | A1 * | 3/2010 | Horiike | B23C 5/109 407/40 |
| 2010/0092253 | A1 * | 4/2010 | Ishida | B23C 5/06 407/42 |
| 2010/0278603 | A1 | 11/2010 | Fang et al. | |
| 2011/0081210 | A1 * | 4/2011 | Ishida | B23C 5/207 407/42 |
| 2011/0293383 | A1 * | 12/2011 | Kaufmann | B23B 27/143 407/114 |
| 2012/0063858 | A1 * | 3/2012 | Onozawa | B23B 51/048 408/200 |
| 2012/0294682 | A1 * | 11/2012 | Park | B23B 27/141 407/114 |
| 2012/0294686 | A1 * | 11/2012 | Ishida | B23C 5/06 409/132 |
| 2017/0028481 | A1 * | 2/2017 | Sato | B23B 51/048 |

FOREIGN PATENT DOCUMENTS

| | | | | |
|---|---|---|---|---|
| EP | 0181844 | A2 | 5/1986 | |
| JP | 59196107 | A * | 11/1984 | ........... B23B 27/143 |
| JP | 06297224 | A * | 10/1994 | |
| JP | 2008055600 | A * | 3/2008 | |
| JP | 2013230513 | A * | 11/2013 | |
| WO | 03/099495 | A1 | 12/2003 | |

* cited by examiner

DRILL AND DRILL INSERT WITH CHIPBREAKER PROTRUSIONS

RELATED APPLICATION DATA

This application is a § 371 National Stage Application of PCT International Application No. PCT/EP2015/079116 filed Dec. 9, 2015 claiming priority of EP Application No. 14199358.4, filed Dec. 19, 2014.

BACKGROUND AND SUMMARY

The present invention relates to drills with drilling inserts and, more particularly, to drills with drilling inserts with chipbreaker arrangements.

In drilling operations, it is important to be able to remove chips formed from the workpiece from the hole being drilled in the workpiece. Removal of chips is facilitated when the chips are small so that they can be removed up the flutes of the drill. In drilling relatively ductile materials such as low carbon steel, and in drilling many of the stainless type steels and other alloys the chips tend to remain in relatively long lengths. During drilling operations, the more ductile that the material being drilled is, the longer the chips formed tend to be. It is therefore desirable to provide means for handling chips formed during a drilling operation, particularly for drilling in relatively ductile materials.

In accordance with an aspect of the present invention, a drill comprises a drill body comprising a shank end and a tip end, at least two flutes extending from the tip end toward the shank end, and an insert-receiving pocket disposed at the tip end of each flute, a peripheral one of the pockets being disposed closer to a radial periphery of the drill body than to a central axis of the drill body and a central one of the pockets being disposed closer to the central axis of the drill body than to the radial periphery of the drill body, a peripheral insert disposed in the peripheral pocket, the peripheral insert having a radial cutting edge extending generally in a direction of a radius of the drill body, a central insert disposed in the central pocket, the peripheral insert having a radial cutting edge extending generally in a direction of the radius of the drill body, wherein the peripheral insert comprises a rake face including a plurality of chipbreaker protrusions, and a first angle measured between a line tangent to forward ends of the plurality of chipbreaker protrusions and the central axis of the drill body extending toward the shank end is an acute angle.

In accordance with another aspect of the present invention, a peripheral insert for the defined drill comprises a rake face having a plurality of chipbreaker protrusions, wherein a first angle measured between a line tangent to forward ends of the plurality of chipbreaker protrusions defines a nonzero angle with an associated cutting edge of the peripheral insert.

The drill according to this aspect of the invention is particularly useful in evacuating chips formed during drilling operations in relatively ductile materials. More particularly, the structure of the drilling insert facilitates the formation of formed or rolled up chip that can be more easily removed through the flutes of the drill than long, straight chips. The configuration can decrease contact between the chip and the face of the drilling insert, can facilitate keeping temperature down as more tends to stay in the chip, reduce drilling forces, and extend tool life.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

A drilling insert 21 according to an aspect of the present invention is shown in FIGS. 1A-1D. The insert 21 comprises a cutting edge 23 comprising an end portion 25 and a central portion 27. The insert further comprises a top surface 29 of the insert that is defined at least in part by the cutting edge 23. The top surface 29 comprises a rake face 31 disposed inwardly of the cutting edge 23. The drilling insert 21 is particularly useful in drilling applications on drills, such as the drill disclosed in U.S. Pat. No. 7,677,845, Col. 1, line 29, to Col. 4, line 60, which is incorporated by reference. The drilling insert 21 may, however, be useful in other machining applications.

The insert 21 comprises a plurality of chipbreakers 33 and 35 on the top surface disposed inwardly of the cutting edge 23. The plurality of chipbreakers comprises at least one end chipbreaker 33 proximate the end portion 25 of the cutting edge 23 and at least one central chipbreaker 35 proximate the central portion 27 of the cutting edge. The central chipbreaker 35 ordinarily extends an equal distance DC above the central portion 27 of the cutting edge 23 as a distance DE by which the end chipbreaker 33 extends above the end portion 25 of the cutting edge. The central chipbreaker 35 ordinarily extends a greater distance DCa above a certain portion 29a between the cutting edge 23 than a distance DEa by which the end chipbreaker 33 extends above the portion 29a. The portion 29a can be a convex, concave, or flat portion, and can be characterized in a number of ways, such as by being a particular distance from a cutting edge, or a particular distance from a top point on the chipbreaker, or by some physical characteristic such as the peak of a protrusion or lowest point of a recess.

The drilling insert 21 according to this aspect of the invention is particularly useful in evacuating chips formed during drilling operations in relatively ductile materials. More particularly, the structure of the drilling insert facilitates the formation of formed or rolled up chip that can be more easily removed through the flutes of the drill than long, straight chips. The configuration can decrease contact between the chip and the face of the drilling insert 21, can facilitate keeping temperature down as more tends to stay in the chip, reduce drilling forces, and extend tool life. The drilling inserts 21' and 21" shown in FIGS. 2A-3E offer similar advantages.

The top surface 29 can comprise a land surface 37 disposed inwardly of the cutting edge 23 between the cutting edge and the rake face 31. The land surface 37 can define an angle λ with a plane P of the top surface 29, and the rake face 31 can define a rake angle Θ with the plane of the top surface. The land surface angle λ is typically less than the rake angle Θ, with the rake angle typically measuring between about 10°-20°, and the land surface angle typically measuring between about −5° and 5°.

The top surface 29 typically comprises a groove 39 inwardly of the cutting edge 23 and below the cutting edge 23 in a direction D away from the top surface 29. The rake face 31 comprises at least part of the groove 39. The end chipbreaker 33 and the central chipbreaker 35 are disposed on one side of the groove 39 and the cutting edge 23 and the land surface 37 are disposed on an opposite side of the groove.

As seen with respect to the insert 21 shown in FIGS. 1A-1D, the insert 21' shown in FIGS. 2A-2D, and the insert 21" shown in FIGS. 3A-3E, the drilling insert can comprise a plurality of cutting edges 23, 23', and 23". For purposes of discussion the insert 21 of FIGS. 1A-1D will be described, however, it will be appreciated that the description of the insert of FIGS. 1A-1D applies as well to the inserts of FIGS. 2A-2D and FIGS. 3A-3E, except where otherwise indicated. Each cutting edge 23 comprises an end portion 25 and a central portion 27. The insert 21 comprises a plurality of chipbreakers on the top surface 29 disposed inwardly of each cutting edge 23, the plurality of chipbreakers comprising at least one end chipbreaker 33 proximate the end portion 25 of each cutting edge and at least one central chipbreaker 27 proximate the central portion of each cutting edge. The drilling insert 21 can be square and comprise four cutting edges, and four corners 43, however, the insert may have configurations other than square, and have fewer or more than four cutting edges. Each end chipbreaker 25 can form an end chipbreaker for two adjacent ones of the cutting edges 23.

The central chipbreaker 35 can be longer in a direction along a length of the cutting edge than in a direction perpendicular to the cutting edge. The cutting edge 23 can be straight. The central chipbreaker 35 can be convex in a direction facing the cutting edge 23. The curve of the central chipbreaker 35 can roughly follow the curve of a central through-hole H in the insert. The radius of the convex edge of the central chipbreaker can be less than a distance from the central axis of the insert to the convex edge of the central chipbreaker, and the radius of an internal, concave edge of the central chipbreaker can be equal to a distance from the central axis of the insert to the concave edge of the central chipbreaker.

As seen in FIGS. 2A-2E, the insert 21' can comprise a rake face with one or more intermediate chipbreaking protrusions (for example 41a') between the cutting edge 23' and the central chipbreaker 35'. The chipbreaking protrusions (for example 41a') are spaced from a cutting corner bisector and disposed between the cutting edge and the central chipbreaker 35' can be disposed below a level of the cutting edge 23' in the direction D away from the top surface. The chipbreaking protrusions can be disposed between the end chipbreaker 33' and the central chipbreaker 35'. The central chipbreaker 35' ordinarily extends a greater distance DCa above a portion 29a' between the cutting edge 23' and the top surface than a distance DEa by which the end chipbreaker 33' extends above the portion 29a'. The portion 29a' is convex and can be characterized as the top point on a chipbreaker protrusion.

The protrusions may be of different sizes and/or heights, such as smaller at the periphery side of the insert and larger at the center side when mounted in a drill body. As shown in FIG. 2E the protrusions may be of different heights, such as smaller at the peripheral end or side 25' of the associated cutting edge and larger at the other side of said edge when mounted in a drill body. Stated another way, at least three protrusions in the plurality of chipbreaker protrusions 41a', 41b', 41aa', 41bb', . . . , 41nn' may be of different sizes and/or heights.

Figure 1A:
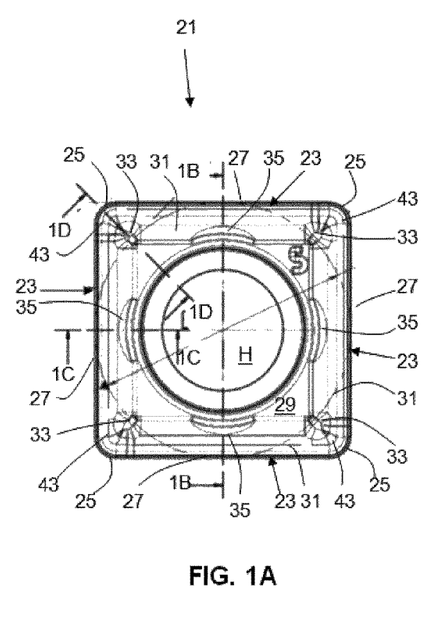
FIG. 1A is a top plan view of a drilling insert according to an aspect of the present invention.
Figure 1B:
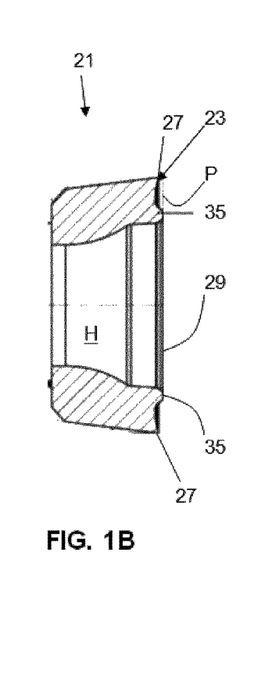
FIG. 1B is a cross-sectional view of the drilling insert of FIG. 1A taken at section 1B-1B.
Figure 1C:
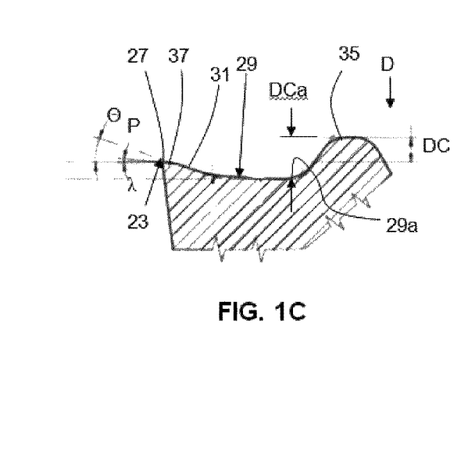
FIG. 1C is a cross-sectional view of the drilling insert of FIG. 1A taken at section 1C-1C.
Figure 1D:
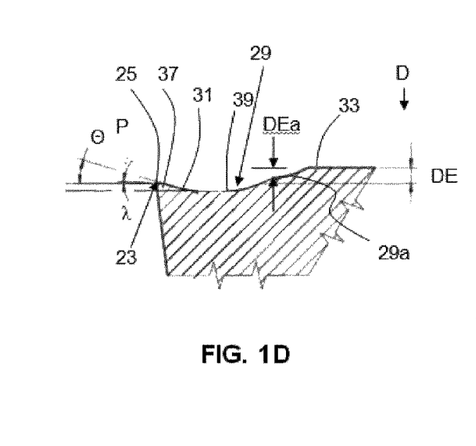
FIG. 1D is a cross-sectional view of the drilling insert of FIG. 1A taken at section 1D-1D.
Figure 2A:
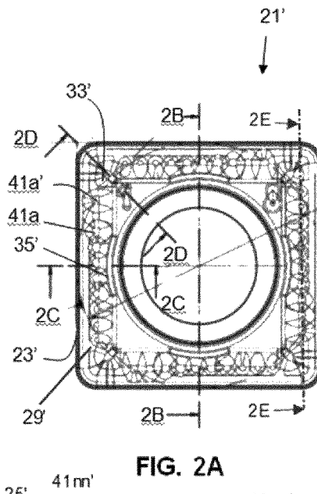
FIG. 2A is a top plan view of a drilling insert according to an aspect of the present invention.
Figure 2B:
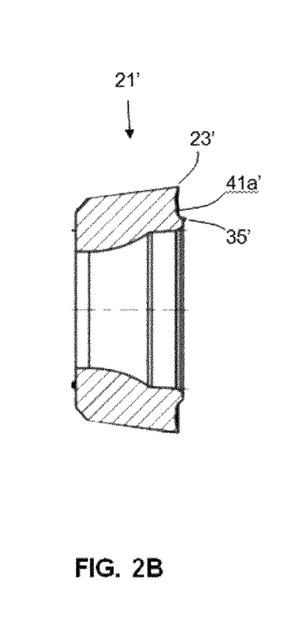
FIG. 2B is a cross-sectional view of the drilling insert of FIG. 2A taken at section 2B-2B.
Figure 4A:
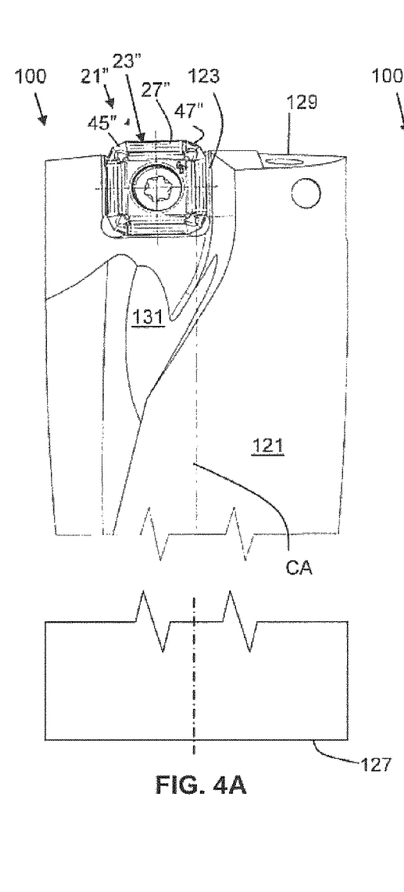
FIGS. 4A-4C are views of a portion of a drill according to an aspect of the present invention in different rotational positions.
Figure 4B:
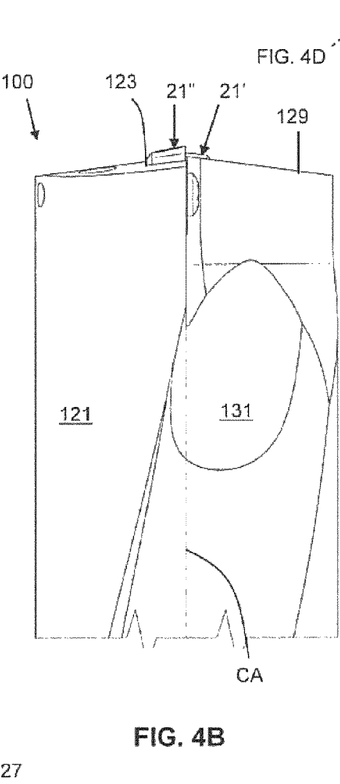
Figure 4C:
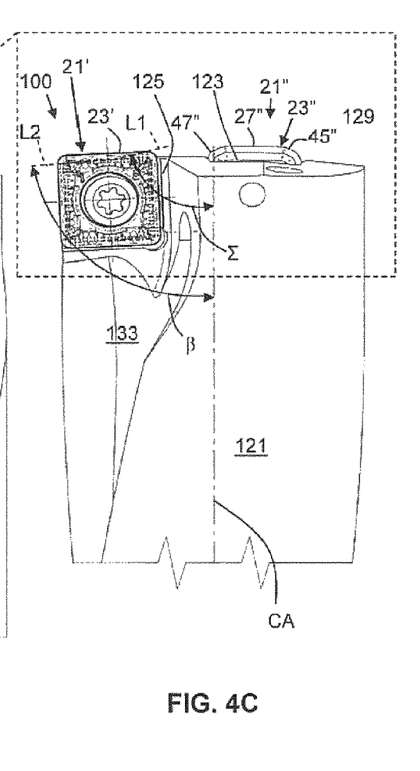
Figure 4D:
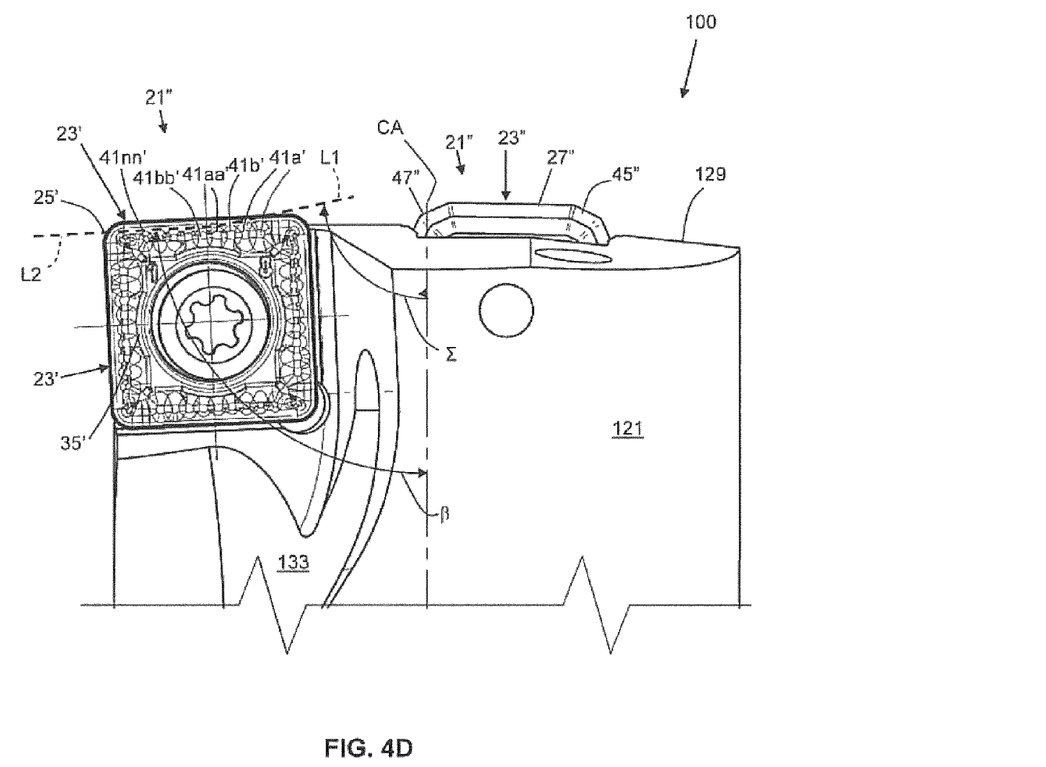
FIG. 4D is an enlarged view of a portion of FIG. 4C.

The cutting edge 23' of the peripheral insert 21' is ordinarily substantially straight when the insert is viewed along a central axis of the insert as in FIGS. 2A, 4C, and 4D. A line L1 tangent to the forward ends of a plurality of chipbreaker protrusions 41a' and 41b' defines a non-zero angle λ with the radial or associated cutting edge 23'. The angle Δ may be chosen in the interval of 0.5 to 5°. The chipbreaker protrusions 41a' and 41b' may be but are not necessarily chipbreaker protrusions closest to the corner 25' of the insert 21'. The rake face of the peripheral insert 21 can also comprise a second plurality of chipbreaker protrusions 41aa' 41bb', . . . , 41nn'. The chipbreaker protrusion 41a' may be spaced less from the associated cutting edge 23' than the chipbreaker protrusion 41nn' at the opposite end of the cutting edge.

The square insert 21" illustrated in FIGS. 3A-3E also includes a cutting edge 23" and end chipbreakers 33" and central chipbreakers 35". The insert 21" comprises four corners 43" and the end portion 25" of the cutting edge 23" comprises a first chamfer edge 45" and a second chamfer edge 47" between the first chamfer edge and the central portion 27" of the cutting edge. The first chamfer edge 45 can have a larger rake angle Θ1 (FIG. 3E) than the rake angle Θ2 (FIG. 3D) of the second chamfer edge 47". The rake angle Θ1 of the first chamfer edge 45" can be greater on a side 45a" of the first chamfer edge opposite the second chamfer edge 47" than on a side 45b" of the first chamfer edge closest to the second chamfer edge. By providing the geometry described in connection with the insert of FIGS. 3A-3E including different rake angles Θ1 and Θ2, drilling forces during machining, particularly of soft materials, can be reduced. U.S. Pat. No. 6,039,515, which is incorporated by reference, discloses drilling inserts with edge geometries similar to those described in connection with the insert 21" of FIGS. 3A-3E, drills using such inserts, and the use of such inserts and drills. The central chipbreaker 35" ordinarily extends a greater distance DCa above a certain portion 29a" between the cutting edge 23" than a distance DEa by which the end chipbreaker 33" extends above the portion 29a". The central chipbreaker 35" is optional and is not shown in FIG. 3C. The portion 29a" can be a convex, concave, or flat portion, and can be characterized in a number of ways, such as by being a particular distance from a cutting edge, or a particular distance from a top point on the chipbreaker, or by some physical characteristic such as the peak of a protrusion or lowest point of a recess.

A drill 100 according to an aspect of the present invention is shown in FIGS. 4A-4D and includes a drill body 121 with center pockets, i.e. recesses 123 for holding central inserts 21" of the type shown in FIGS. 3A-3E and peripheral pockets, i.e. recesses 125 (FIGS. 4C and 4D) for holding peripheral inserts 21' (FIG. 4C) as shown in FIGS. 2A-2E. The insert 21 shown in FIG. 1A-1D is also a peripheral insert and may be exchanged for the insert 21' in FIGS. 4A-4D.

The drill body 121 comprises a shank end 127 (FIG. 4A) and a tip end 129, at least two flutes 131 (FIGS. 4A-4B) and 133 (FIGS. 4C-4D) extending from the tip end toward the shank end. The insert-receiving pockets 123 and 125 are disposed at the tip end of each flute 131 and 133. A peripheral one 125 of the pockets is disposed closer to a radial periphery of the drill body 121 than to a central axis CA of the drill body and a central one 123 of the pockets is disposed closer to the central axis of the drill body than to the radial periphery of the drill body.

The peripheral insert 21' disposed in the peripheral pocket 125 has a radial cutting edge, i.e., cutting edge 23' extending generally in a direction of a radius of the drill body 121. The central insert 21" disposed in the central pocket 123 has a radial cutting edge, i.e., cutting edge 23" extending generally in a direction of the radius of the drill body 121.

The peripheral insert 21' comprises the rake face having the plurality of chipbreaker protrusions 41a' and 41b'. As seen in FIGS. 4C and 4D, a first angle Σ measured between the line L1 tangent to forward ends of the plurality of chipbreaker protrusions 41a' and 41b' and the central axis CA of the drill body extending toward the shank end 127 is an acute angle. The peripheral insert 21' can be indexable and can have a square basic shape.

The central insert 21" can be indexable and have a substantially square basic shape. The radial cutting edge 23" of the central insert comprises the central portion 27" and chamfered end components 45" and 47" on opposite sides of the central component. As seen in FIGS. 4A, 4C, and 4D, portions of the radial cutting edge 23" of the central insert 21" can be disposed on opposite sides of the central axis CA of the drill body 121. Typically, only a chamfered end component 47", or part thereof, of the radial cutting edge 23" will be disposed on an opposite side of the central axis CA of the drill body 121 from the central portion 27" and the chamfered end component 45.

It will be seen from FIGS. 4A and 4C-4D that a profile defined by the radial cutting edge 23' of the peripheral insert by rotation of the peripheral insert 21' about the central axis CA of the drill body 121 overlaps a profile defined by the radial cutting edge 23" of the central insert 21" by rotation of the central insert about the central axis of the drill body.

The radial cutting edge 23' of the peripheral insert 21' is ordinarily substantially straight when the insert is viewed along a central axis of the insert as in FIGS. 2A, 4C, and 4D. As seen in FIG. 2A, the line L1 tangent to the forward ends of the plurality of chipbreaker protrusions 41a' and 41b' defines a non-zero angle Δ with the radial cutting edge 23'. A distance between the line L1 tangent to the forward ends of the plurality of chipbreaker protrusions 41a' and 41b' and the radial cutting edge 23' of the peripheral insert 21' increases with increasing distance from the central axis CA of the drill body 121.

The rake face of the peripheral insert 21 can comprise the second plurality of chipbreaker protrusions 41aa' 41bb', . . . , 41nn'. As seen in FIGS. 4C and 4D, a second angle β measured between a line L2 tangent to forward ends of the second plurality of chipbreaker protrusions 41aa' 41bb', . . . , 41nn' and the central axis CA of the drill body 121 extending toward the shank end 127 is a second acute angle that is larger than the first angle Σ. The second plurality of protrusions 41aa' 41bb', . . . , 41nn' is disposed at a greater distance from the central axis CA of the drill body than the plurality of protrusions 41a', 41b'. The second line L2 may be parallel to the cutting edge 23' or define a non-zero angle with the radial cutting edge that is smaller than the angle Δ.

Figure 2C:
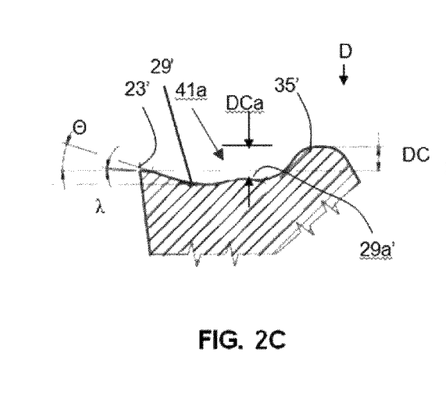
FIG. 2C is a cross-sectional view of the drilling insert of FIG. 2A taken at section 2C-2C.
Figure 2D:
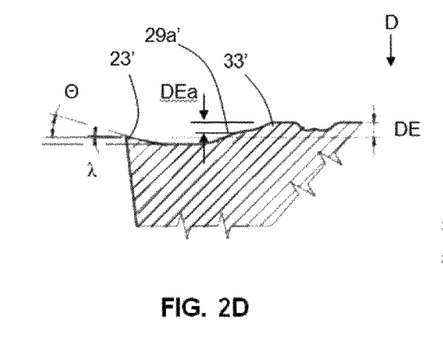
FIG. 2D is a cross-sectional view of the drilling insert of FIG. 2A taken at section 2D-2D.
Figure 2E:
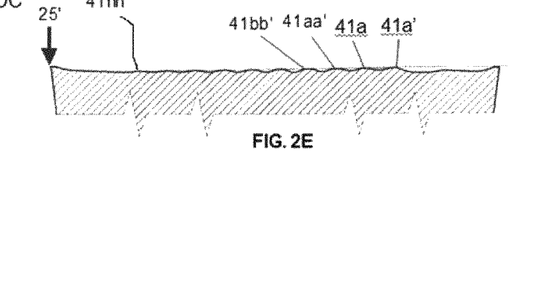
FIG. 2E is a cross-sectional view of the drilling insert of FIG. 2A taken at section 2E-2E.
Figure 3A:
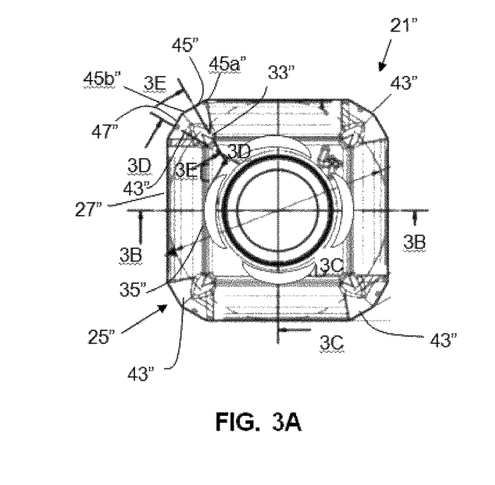
FIG. 3A is a top plan view of a drilling insert according to an aspect of the present invention.
Figure 3B:
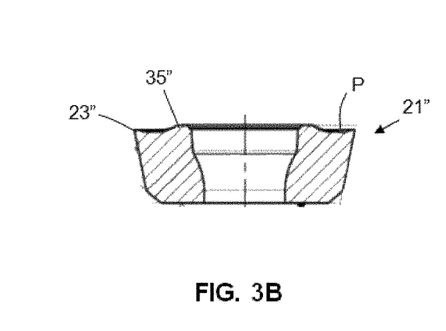
FIG. 3B is a cross-sectional view of the drilling insert of FIG. 3A taken at section 3B-3B.
Figure 3C:
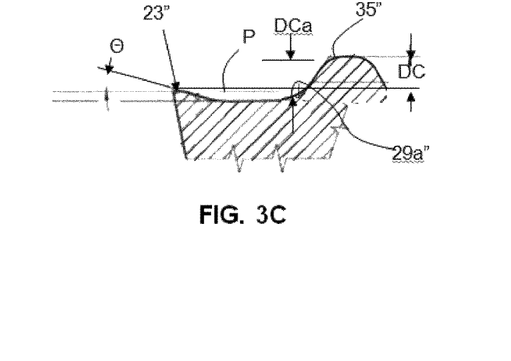
FIG. 3C is a cross-sectional view of the drilling insert of FIG. 3A taken at section 3C-3C.
Figure 3D:
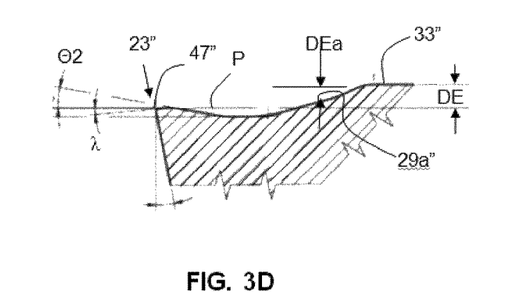
FIG. 3D is a cross-sectional view of the drilling insert of FIG. 3A taken at section 3D-3D.
Figure 3E:
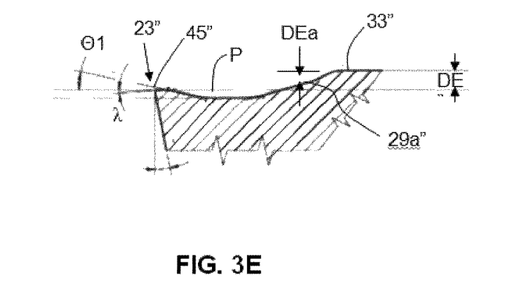
FIG. 3E is a cross-sectional view of the drilling insert of FIG. 3A taken at section 3E-3E.

In the shown embodiment the chipbreaker protrusions project from a surface continuous with the rake face 29' as best shown in FIG. 2C, such that the tangent or tangents to the chipbreaker protrusions widens away from the cutting edge 23' radially outwardly substantially from one corner 25 to another and thereby guiding the chip in a favorable manner during drilling.

As seen in FIGS. 4C and 4D, the peripheral insert 21' comprises an axial cutting edge 23' extending generally in a direction of the central axis CA of the drill body 121. A corner 25' at an intersection between the axial cutting edge 23' and the radial cutting edge 23' of the peripheral insert 21' defines a radially outermost part of the drill and, thus, ordinarily determines the diameter of a hole to be drilled by the drill. As the peripheral insert 21' is ordinarily indexable, the axial cutting edge 23' and the radial cutting edge 23' of the peripheral insert are ordinarily identical. The central chipbreaker 35' on the rake face of the peripheral insert 21' typically comprises a central chipbreaker protrusion disposed, relative to the radial cutting edge 23', inwardly of the plurality of chipbreaker protrusions 41a' and 41b' and inwardly of the second plurality of protrusions 41aa' 41bb', . . . , 41nn'.

Thus the invention aims to solve the problem of poor chip breaking which is a common problem when drilling in ductile steel and stainless steels. Poor chip breaking usually causes bad surface finish, poor hole tolerances and can also cause drill breakage. The invention proposes to solve the problems by improving the chip breaking. A plurality of chipbreaker protrusions is located substantially in the rake face, behind the cutting edge and the land surface substantially in the chip flow direction. A tangent to forward ends of the plurality of chipbreaker protrusions forms an acute angle with the associated cutting edge.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The invention claimed is:

1. A drill comprising:
a drill body including a shank end and a tip end, at least two flutes extending from the tip end toward the shank end, and an insert-receiving pocket disposed at the tip end of each flute, a peripheral one of the pockets being disposed closer to a radial periphery of the drill body than to a central axis of the drill body and a central one of the pockets being disposed closer to the central axis of the drill body than to the radial periphery of the drill body;
a peripheral insert disposed in the peripheral pocket, the peripheral insert having a radial cutting edge extending generally in a direction of a radius of the drill body; and a central insert disposed in the central pocket, the central insert having a radial cutting edge extending generally in a direction of the radius of the drill body, wherein the peripheral insert includes a rake face including a plurality of chipbreaker protrusions and a central chipbreaker protrusion, disposed relative to the radial cutting edge inwardly of the plurality of chipbreaker protrusions, including a first angle measured between a line tangent to forward ends of the plurality of chipbreaker protrusions and the central axis of the drill body extending toward the shank end forming an acute angle with an associated cutting edge, wherein the radial cutting edge of the peripheral insert is substantially straight when the insert is viewed along a central axis of the insert, and the line tangent to the forward ends of the plurality of chipbreaker protrusions define a non-zero angle with the radial cutting edge of the peripheral insert.

2. The drill as set forth in claim 1, wherein the peripheral insert is indexable and has a square basic shape.

3. The drill as set forth in claim 1, wherein the central insert is indexable and has a substantially square basic shape.

4. The drill as set forth in claim 1, wherein the radial cutting edge of the central insert has a central portion and chamfered end components on opposite sides of the central portion.

5. The drill as set forth in claim 1, wherein the radial cutting edge of the central insert is disposed on opposite sides of the central axis of the drill body.

6. The drill as set forth in claim 1, wherein a profile defined by the radial cutting edge of the peripheral insert by rotation of the peripheral insert about the central axis of the drill body overlaps a profile defined by the radial cutting edge of the central insert by rotation of the central insert about the central axis of the drill body.

7. The drill as set forth in claim 1, wherein a distance between the line tangent to the forward ends of the plurality of chipbreaker protrusions and the radial cutting edge of the peripheral insert increases with increasing distance from the central axis of the drill body.

8. The drill as set forth in claim 1, wherein the rake face of the peripheral insert includes a second plurality of chipbreaker protrusions, a second angle measured between a second line tangent to forward ends of the second plurality of chipbreaker protrusions and the central axis of the drill body extending toward the shank end being a second acute angle that is larger than the first angle.

9. The drill as set forth in claim 8, wherein the second plurality of protrusions is disposed at a greater distance from the central axis of the drill body than the plurality of protrusions.

10. The drill as set forth in claim 1, wherein the peripheral insert includes an axial cutting edge extending generally in a direction of the central axis of the drill body.

11. The drill as set forth in claim 10, wherein a corner at an intersection between the axial cutting edge and the radial cutting edge of the peripheral insert defines a radially outermost part of the drill.

12. The drill as set forth in claim 10, wherein the axial cutting edge and the radial cutting edge of the peripheral insert are identical.

* * * * *